US005473116A

United States Patent [19]

Humphrey et al.

[11] Patent Number: 5,473,116

[45] Date of Patent: Dec. 5, 1995

[54] QUICK CHANGE ANTI-CORONA CONNECTOR

[75] Inventors: James R. Humphrey, Dixon; Steven C. Tietsworth, San Diego, both of Calif.

[73] Assignee: The United States of America as represented by the Secretary of the Navy, Washington, D.C.

[21] Appl. No.: 223,480

[22] Filed: Mar. 31, 1994

[51] Int. Cl.$^{6}$ .......................... H02G 15/103; H01R 43/20

[52] U.S. Cl. .......................... 174/73.1; 174/5 R; 439/181; 439/797; 29/876

[58] Field of Search .................................... 174/73.1, 5 R, 174/74 R, 140 CR, 140 R, 144, 145, DIG. 10, 152 R, 169; 439/181, 797, 798, 894, 921; 336/84 C, 84 R; 324/726; 29/747, 748, 758, 764, 876, 602.1

[56] References Cited

U.S. PATENT DOCUMENTS

| | | | |
|---|---|---|---|
| 2,663,753 | 12/1953 | Bird . | |
| 3,184,745 | 5/1965 | Betcher . | |
| 3,334,326 | 8/1967 | Besore et al. . | |
| 3,955,871 | 5/1976 | Kruger . | |
| 3,966,294 | 6/1976 | Benton | 174/145 X |
| 3,988,527 | 10/1976 | Berger et al. . | |
| 4,046,958 | 9/1977 | Lusk | 174/73.1 |
| 4,771,292 | 9/1988 | Beach et al. . | |
| 5,021,001 | 6/1991 | Ramirez . | |
| 5,077,450 | 12/1991 | Rafiee | 174/145 |
| 5,244,423 | 9/1993 | Erickson et al. | 439/798 |
| 5,336,852 | 8/1994 | Goch et al. | 174/140 CR X |

FOREIGN PATENT DOCUMENTS

| | | | |
|---|---|---|---|
| 0406099 | 1/1991 | European Pat. Off. | 174/144 |
| 3236910 | 4/1984 | Germany | 174/140 CR |

*Primary Examiner*—Kristine L. Kincaid
*Assistant Examiner*—Paramita Ghosh
*Attorney, Agent, or Firm*—Harvey Fendelman; Thomas Glenn Keough

[57] ABSTRACT

A high-voltage anti-corona connector and method of use rely upon a hand-rotatable wheel which is attachable to a threaded stud on a mounting flange for rapidly connecting and disconnecting an adaptor plate to a helix coil of a radio frequency transmit system. The handle of the wheel is ring shaped to preventing corona discharge from the area surrounding the connector.

21 Claims, 2 Drawing Sheets

QUICK CHANGE ANTI-CORONA CONNECTOR

STATEMENT OF GOVERNMENT INTEREST

This invention described herein may be manufactured and used by or for the Government of the United States of America for governmental purposes without the payment of any royalties thereon or therefor.

BACKGROUND OF THE INVENTION

This invention relates generally to electrical connectors for use with high power radio frequency transmit systems. More specifically, this invention relates to connectors which provide corona protection and are quickly connectable and disconnectable.

Low frequency radio signals are easily distortable by naturally occurring background noise. For increased signal clarity, a large amount of power is required. In some radio transmit system applications, for example, high-voltages and power in the range of 50,000 to 3,000,000 watts are used.

High power radio frequency transmit systems are tuned to a desired frequency by the use of high-voltage helix coils, variometers and other tuning components. A helix tuning coil typically has a multitude of connection points along the length of the coil. By applying a voltage having desired signal to a selected connection point, the frequency of the radio transmit system can be varied or adjusted. Thus, various high-voltage connectors have been developed.

A typical high-voltage connector utilizes copper plates having six equally spaced nuts, bolts and lock washers spaced everily near the perimeter of the plate to hold a connection together. On a large helix coil, these connection points can be awkwardly positioned, some over twenty-five feet above the floor. Various tools are required to change the connector. An operator may require as much as half of an hour to change an existing connection.

An additional problem stems from the fact that high voltage electricity has a tendency to arc, especially at pointed or abrupt connection points. Such arcing is technically named corona and is characterized by a blue luminous glow and crackling or hissing sounds. Corona discharges can damage surrounding equipment and cause significant power losses. It is, thus, desirable to prevent corona discharges from the area surrounding high-voltage connectors.

Technically, corona discharge from a high voltage connector occurs when the voltage gradient (voltage per unit area) reaches a critical value. Since the voltage gradient is dependent on the geometry of the connection, a connector having a relatively small area with sharp edges will more likely discharge corona than a connector having larger, curved geometry. No provision is made on existing connectors to control electric field gradients at of near the connectors to reduce the likelihood of arcing or corona.

With the present inventive concept, the foregoing limitations have been recognized to provide quick high-voltage connections and protection against corona. This concept, simply stated, includes employing a hand rotatable connector having a geometry which is designed to control electric field gradients near the connector to protect against corona discharge.

SUMMARY AND OBJECTS OF THE INVENTION

In accordance with the present invention, an anti-corona connector and method of using the connector are provided. The anti-corona connector includes a mounting portion having a threaded stud and being adapted for being secured to a fixed mount on a high voltage assembly. An adaptor plate has a hole sized for receiving the threaded stud, and is adapted for connecting an electrical cable. A corona resistant wheel has a sleeve configured for engaging the threaded stud and is adapted for rotating the sleeve on the threaded stud for holding the adaptor plate, mounting portion, and fixed mount together. The method for providing anti-corona protection for a high voltage connection includes connecting a mounting portion to a high voltage connection point. The mounting portion is formed with a first threaded coupling. Next, an adaptor plate which is connected to a cable is placed adjacent to the mounting portion. The first threaded coupling is engaged with a mating second threaded coupling on a corona resistant wheel. The corona resistant wheel is adapted for rotating the second threaded coupling on the first threaded coupling to hold the adaptor plate and the mounting portion together. Rotating the corona resistant wheel having the second threaded coupling on the first threaded coupling holds the adaptor plate and the mounting portion together.

Accordingly, it is an object of the present invention to provide a anti-corona connector which is quickly connectable and disconnectable.

It is another an object of the present invention to provide a high-voltage connector for controlling the voltage gradient near the connector to prevent corona discharge.

It is yet another object of the invention to provide a coupling which is hand rotatable for operation without the need for tools.

It is a further object of the invention to provide an anti-corona connector having a rotatable ring shaped handle which simultaneously serves to connect an adaptor plate in electronic communication with a high voltage mounting flange and inhibit corona discharge from the area surrounding the flange.

Yet another object of the invention is to provide a method of employing an anti-corona connector which is quickly connectable and disconnectable for varying the frequency of a signal developed by a helix coil of low frequency radio transmit system.

These and other objects of the invention will become more readily apparent from the ensuing specification and drawings when taken in conjunction with the appended claims.

DESCRIPTION OF THE PREFERRED EMBODIMENT

Figure 1:
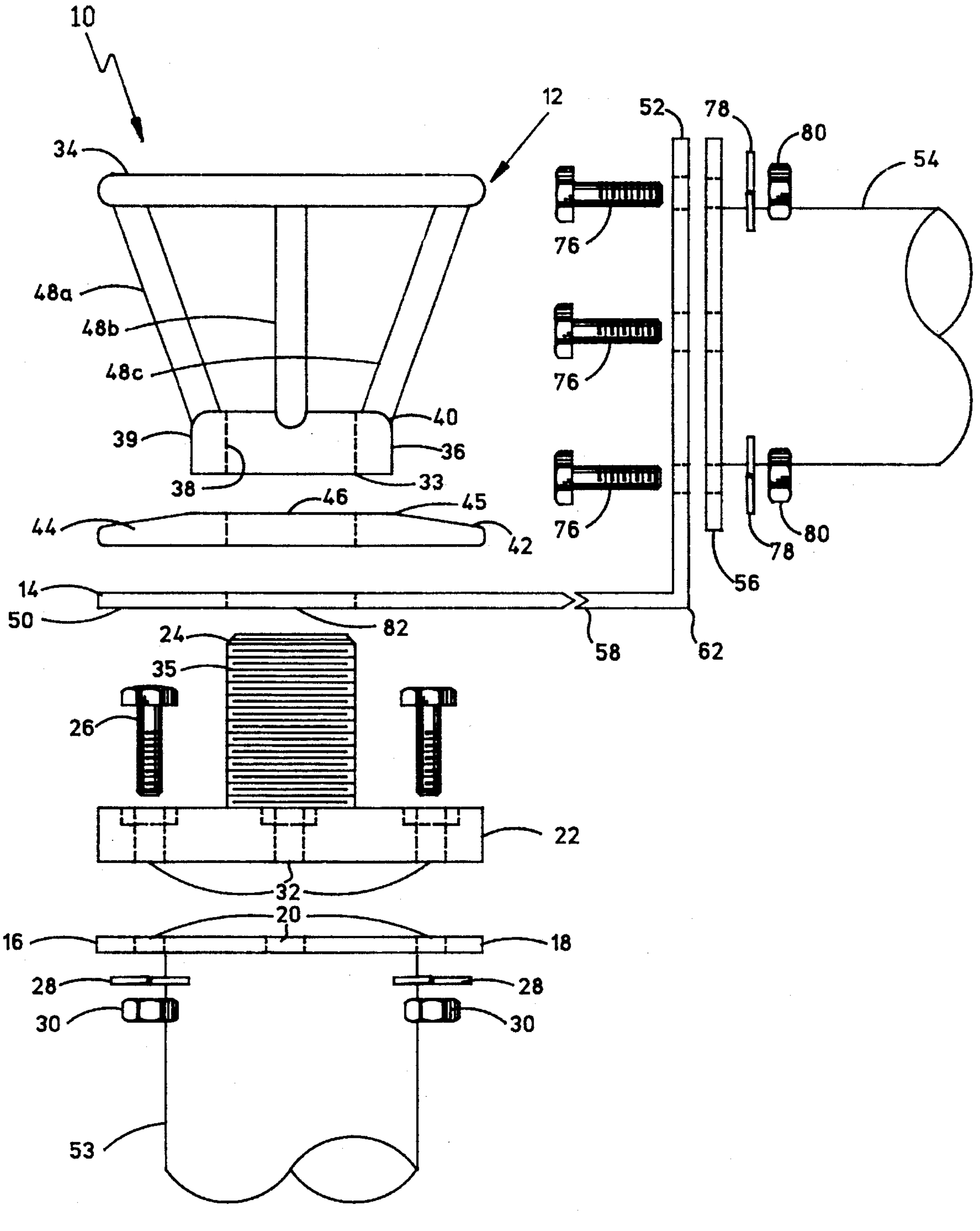
FIG. 1 is an exploded view of the anti-corona connector.
Figure 2:
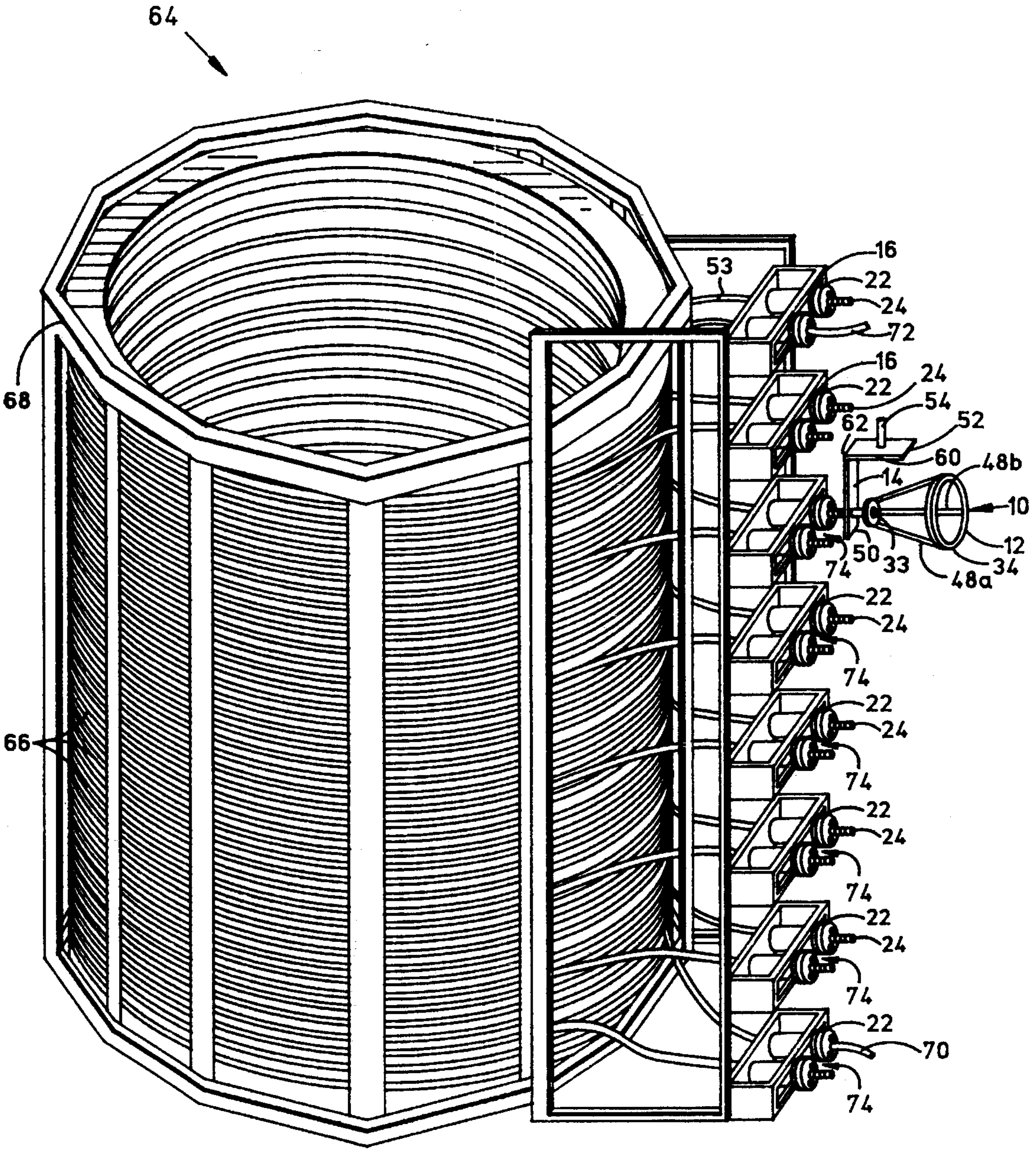
FIG. 2 is a perspective view of a helix coil assembly employing an anti-corona connector.

Referring to FIGS. 1 and 2 of the drawings, an anti-corona connector 10 is shown which is capable of rapid connection with, and disconnection from a high voltage assembly, a helix tuning coil of a radio frequency transmit system. Anti-corona connector 10 is formed from electrically conductive material having a geometry adapted to prevent corona discharge from the area surrounding the connector.

To facilitate speedy connection and disconnection, anti-corona connector 10 includes rotatable wheel 12 for attaching an adaptor plate 14 to fixed mount 16 located at connection point 74 on helix coil assembly 64. A mounting flange 22 is secured on fixed mount 16 for adapting fixed mount 16 for attachment to wheel 12.

Fixed mount 16 is connected electrically to helix coil 66 with a first cable 53 at each connection point 74. The fixed mount 16 connects with mounting flange 22 with a disk-shaped flange 18 formed with several holes 20. Mounting flange 22 is also disk-shaped to conform in shape with fixed mount 16. Mounting flange 22 includes several holes 32 aligned with holes 20 of fixed mount 16. A hex bolt 26 having a lock washer 28 and a hex nut 30 is inserted though each aligned hole 32 and 20 to fasten mounting flange 22 to fixed mount 16.

Threaded stud 24 extends axially from mounting flange 22 for connection with wheel 12. Stud 24 is rigidly affixed to mounting flange 22 by means well-known in the art such as welding.

Although the preferred embodiment of a mounting portion may be mounting flange 22 disclosed as above, any one of a number of configurations may be used in accordance with the present inventive concept. One skilled in the art to which this invention pertains, for example, could adapt a mounting flange geometry to be compatible for connection with any fixed mount type. Alternatively, fixed mount 16 may be formed with mounting portion in the form of a threaded stud for direct connection with wheel 12 so that a mounting flange 22 is not required.

Wheel 12 includes a ring-shaped handle 34 having a circular cross section. Threaded coupling 33 of wheel 12 is a sleeve 36 formed with internal threads 38. Sleeve 36 is connected to handle 34 via a plurality of cylinder-shaped braces **48*a*–48*c*. Each brace 48*a*–48*c*** is cylindrical shaped, having a curved surface to reduce corona.

Sleeve 36 responds to rotation of handle 34. When handle 34 is rotated, sleeve 36 rotates about stud 24 and urges adaptor plate 14 against mounting flange 22. Sleeve 36 is cylindrical in shape, formed with a curved surface 39 having a rounded edge 40 to control voltage gradients and reduce the likelihood of corona discharge from sleeve 36.

A torque spacer 44 is provided between sleeve 36 and adapter plate 14. As shown, torque spacer 44 is an annular plate formed with a hole 46 sized to accommodate or circumscribe the threaded stud 24. When handle 34 is rotated, torque spacer 44 is urged by sleeve 36 to push adaptor plate 14 into a secure position over threaded stud 24 and against mounting flange 22.

Secure positioning of adaptor plate on mounting flange 22 is important to prevent movement, such as rotation, between adaptor plate 14 and mounting flange 22. Thus, electrical communication between plate 14 and mounting flange 22 is not disrupted by movement of adaptor plate 14 and signals produced by the helix coil assembly are not distorted.

Torque spacer 44 is positioned adjacent sleeve 36 so that adaptor plate 14 will not be gouged or scratched by rotation of wheel 12. Furthermore, torque spacer 44 is relatively larger in diameter than sleeve 36 so that force applied by sleeve 36 against adaptor plate 14 will be broadly distributed and so that adaptor plate 14 will be firmly held as desired without bending or otherwise deforming. The annular shape of torque spacer 44 includes a beveled periphery 42 having rounded edges 45. With this geometry, the voltage gradient is controlled and the likelihood of corona discharge at the torque spacer is reduced.

It can be appreciated, however, by those skilled in the pertinent art, that any of a number of suitable torque spacers may be utilized without departing from the present inventive concept. For example, a torque spacer may be utilized which is integral with wheel 12, adaptor plate 14, or with mounting flange 22. A torque spacer 44 having a different geometry may also be employed. In some instances, a torque spacer may not be required for proper operation of connector 10.

Handle 34 is proportionately larger in diameter than sleeve 36. Accordingly, a desired torque may be applied to sleeve 36 through hand rotation of handle 34 by an operator without tools. Handle 34 includes a rounded surface and circular cross-section to limit corona and to afford an operator a firm hand grip so that the anti-corona coupling is easily rotatable and quickly disconnectable. The rounded geometries of handle 34, braces **48*a*–48*c* and sleeve 36** cooperate to limit corona discharge form the area surrounding the anti-corona connector.

Adaptor plate 14 is formed with two ends, a length 58 and a width 60. First end 50 of adaptor plate 14 is formed with a hole 82 sized to accommodate and circumscribe threaded stud 24 of mounting flange 22. Second end 52 connects various other electrical connectors as desired, for example, a second cable 54. Connection with second cable 54 may be made by means well-known in the art of cable connections. As shown in FIG. 1, second cable 54 includes a flange 56 bolted directly to second end 52 of adaptor plate 14 by several bolts 76, lock washers 78 and hex nuts 80. The geometry of adaptor plate 14 may be varied for a wide range of connective-applications.

As shown in FIGS. 1 and 2, adaptor plate 14 is longer than wide. Length 58, includes an angled portion 62 for distancing second end 52 of adaptor plate 14 from mounting flange 22. This angled configuration serves also to separate second cable 54 from helix coil assembly 64 and control voltage gradients near connector 10 to inhibit corona discharge.

It can be appreciated that, although adaptor plate 14, is disclosed having specific geometry, plates having numerous varied geometries can be employed without departing from the scope of the instant invention. For example, a flat or round adaptor plate could be employed. As another example, a plate having multiple connections could also be employed.

Referring to FIG. 2, a helix coil assembly 64 used for transmitting radio signals is shown formed with a frame 68 enclosing a helix coil 66. Coil 66 has two ends; a first end 70 connected to a high-voltage signal transmitter, and a second end 72 connected to an antenna. As shown, coil assembly 64 is provided with a multitude of serially arranged connection points 74, each of which are electrically connected to helix coil 66. At each connection point 74, fixed mount 16 is electronically connected with coil assembly 64 either directly, or through a first cable 53 as shown.

Coil 66 is tuned to a desired frequency by making an electrical connection with an external voltage source having a desired signal at a selected connection point 74 on the coil 66. Anti-corona connector 10 is used to rapidly change electrical connections between connection points 74.

Operation

In operation, when the a signal transmitted by helix coil 66 is desired to be adjusted or changed, anti-corona coupling 10 may be relied upon. Appropriate mounting flanges 22 are secured to any a plurality of fixed mounts 16 located at serially arranged connection points 74 on helix coil assembly 64.

With anti-corona connector 10 initially attached at a connection point 74 on a mounting flange 22, wheel 12 is counter-rotated by an operator to sequentially remove wheel 12, torque spacer 44 and adaptor plate 14 from mounting flange 22. After removal, adaptor plate 14 is repositioned. Repositioning is achieved by sliding adaptor plate 14 over the threaded stud 24 of another selected mounting flange 22 at a new desired connection point 74. Next, torque spacer 44 slides over threaded stud 24 and is thereby positioned against adaptor plate 14. Wheel 12 is placed so that the threaded sleeve mates with threaded stud of mounting flange 22. Handle 34 of the wheel is rotated about the threaded stud by an operator to urge torque spacer 24 against adaptor plate 14. When wheel 12 is torqued properly, adaptor plate 14 and mounting flange 22 are held tightly together to establish electronic communication between the second cable 54 (or other desired connections) and the helix coil 66. This process may be repeated as desired to adjust the frequency output from helix coil 66.

As disclosed, the invention provides an anti-corona connector and method of using the connector to quickly make electrical connections on a low frequency transmission coil. While the invention has been described with reference to a preferred embodiment thereof, as will be apparent to those skilled in the art, certain changes and modifications can be made without departing from the scope of the invention as defined by the following claims.

We claim:

1. An anti-corona connector comprising:

a mounting portion having a threaded stud and being adapted for being secured to a fixed mount on a high voltage assembly;

an adaptor plate having a hole sized for receiving said threaded stud, and being adapted for connecting an electrical cable;

a corona resistant wheel having a sleeve configured for engaging said threaded stud and being adapted for rotating said sleeve on said threaded stud for holding said adaptor plate, said mounting portion and said fixed mount together.

2. A device according to claim 1, further comprising:

an annular torque spacer formed with a hole sized for receiving said threaded stud, said spacer having a beveled periphery formed with rounded edges and being disposed between said sleeve and said adaptor plate for securing said adaptor plate on said mounting portion on said fixed mount.

3. A device according to claim 2, wherein said corona resistant wheel includes a ring-shaped handle having a larger diameter than said sleeve for enabling hand-rotation of said sleeve.

4. A device according to claim 3, wherein said ring-shaped handle is coaxially aligned with said sleeve by a plurality of interconnecting cylindrical braces for resisting corona, and said ring-shaped handle is formed with a circular cross-section for providing an operator with a firm hand grip and for resisting corona.

5. A device according to claim 4, wherein said spacer has a larger diameter than said sleeve for distributing force from said sleeve to said adaptor plate, and said sleeve is formed with curved surfaces having rounded edges for resisting corona.

6. A device according to claim 5, wherein said adaptor plate includes a length having an angled portion to space the electrical cable from said fixed mount and said high voltage assembly.

7. An anti-corona connector for interconnecting high voltage cables comprising:

a mounting portion connected to a first cable, said portion being formed with a first threaded coupling;

an adaptor plate connected to a second cable, said adaptor plate being provided with a hole sized to accommodate said threaded coupling and being disposed adjacent said mounting portion;

a corona resistant rotatable wheel formed with a second threaded coupling configured for engaging said first threaded coupling for securing said adaptor plate on said mounting portion.

8. A device according to claim 7, further comprising:

a torque spacer positioned between said rotatable wheel and said mounting portion for holding said adaptor plate and said mounting portion together.

9. A device according to claim 8, wherein said second threaded coupling is an internally threaded sleeve having a curved exterior with a rounded edge for inhibiting corona, and wherein said first threaded coupling is a threaded stud extending axially from said mounting portion.

10. A device according to claim 9, wherein said rotatable wheel is formed with a ring-shaped handle having a circular cross-section, and said handle is aligned coaxially with said sleeve by three cylindrical braces that are tapered from said handle to said sleeve to reduce corona discharge from areas surrounding said connector.

11. A device according to claim 10, wherein said torque spacer is positioned between said sleeve and said adaptor plate, said torque spacer has an annular shape, a beveled periphery and rounded edges for resisting corona, said torque spacer is formed with a hole sized for receiving said threaded stud for holding said adaptor plate and said mounting portion together.

12. A device according to claim 11, wherein said adaptor plate has said hole sized for receiving said threaded stud for retaining said adaptor plate on said threaded stud.

13. A device according to claim 12, wherein said adaptor plate is elongated and said second cable is connected to an end of said elongated adaptor plate for separating said second cable from said first cable.

14. A method for providing anti-corona protection for a high voltage connection comprising the steps of:

connecting a mounting portion to a high voltage connection point, said mounting portion being formed with a first threaded coupling, placing an adaptor plate adjacent to said mounting portion, said adaptor plate being connected to a cable;

engaging said first threaded coupling with a mating second threaded coupling on a corona resistant wheel, said corona resistant wheel being adapted for rotating said second threaded coupling on said first threaded coupling to hold said adaptor plate and said mounting portion together;

rotating said corona resistant wheel having said second threaded coupling on said first threaded coupling to hold said adaptor plate and said mounting portion together.

15. A method according to claim 14, further comprising the step of:

positioning a torque spacer between said corona resistant wheel and said mounting portion to hold said adaptor plate between said wheel and said mounting portion.

16. A method according to claim 15, wherein said first threaded coupling includes a stud extending axially from said mounting portion and said second threaded coupling is an internally threaded sleeve, said sleeve being formed with a curved surface and a rounded edge for inhibiting corona.

17. A method according to claim 16, wherein said corona resistant wheel includes a ring-shaped handle having a circular cross-section, and said sleeve is aligned coaxially with said handle by a plurality of cylindrical braces that are tapered from said handle to said sleeve.

18. A method according to claim 17, wherein said torque spacer is annular shaped and positioned between said sleeve and said adaptor plate, and said torque spacer is formed with a beveled periphery having rounded edges to reduce corona.

19. A method according to claim 18, further comprising the step of:

counter-rotating said corona resistant wheel to remove said wheel, said torque spacer and said adaptor plate from said mounting portion.

20. A method according to claim 19, wherein the steps of placing the adaptor plate adjacent to said mounting portion, positioning said torque spacer against said adaptor plate, engaging said first threaded coupling with said mating second threaded coupling on said corona resistant wheel, rotating said wheel to hold said adaptor plate against said mounting portion, and counter-rotating said wheel are repeated to reposition said adaptor plate at another connection point.

21. A method as recited in claim 19, wherein said adaptor plate is elongated and said cable is connected to an end of said elongated adaptor plate for separating said cable from said high voltage connection point.

* * * * *